United States Patent Office 3,072,829
Patented Jan. 8, 1963

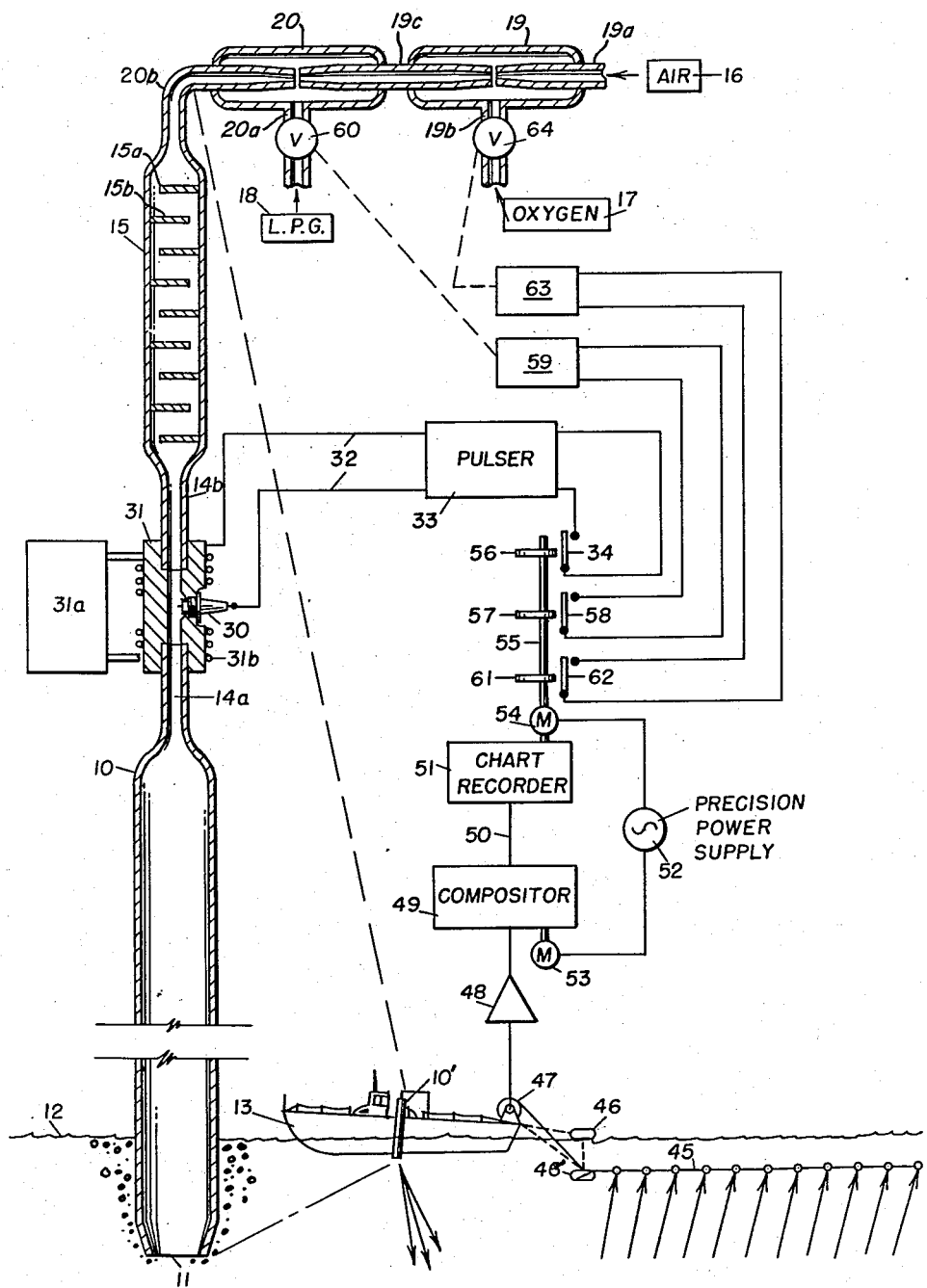

3,072,829
IGNITER FOR A REPETITIVE SEISMIC SOURCE
Frank J. McDonal, Dallas, Tex., assignor, by mesne assignments, to Socony Mobil Oil Company, Inc., New York, N.Y., a corporation of New York
Filed Feb. 17, 1959, Ser. No. 793,911
5 Claims. (Cl. 317—83)

This invention relates to seismic exploration and more particularly to ignition of gases in a detonation type repetitive seismic pulse source.

In copending application Serial No. 600,804, filed July 30, 1956, of William B. Huckabay, now Patent No. 2,994,397, a co-worker of applicant, a seismic energy source is disclosed in which mixtures of air and propane are repetitively ignited at the upper end of an elongated tube. The lower end of the tube is coupled to the earth by immersion in water. As combustion travels downward through the tube, detonation takes place. The resultant wave or flame front reaches a terminal velocity at the surface of the water substantially in excess of the velocity of sound in air. The resultant impact produces seismic waves.

It is an object of the present invention to provide an improved seismic source in which reliable repetitive operation is achieved. More particularly, applicant provides operation of an electrical ignition means in the presence of moisture due to water employed to couple the source to the earth.

In a more specific aspect there is provided a detonation system repetitively loaded with a combustible fluid comprising structure forming an elongated flow channel into which the combustible fluid components flow, the flow channel being an elongated smooth-walled tubular member extending to an outlet port preferably immersed in water for assuring coupling of wave energy in said tubular member to the earth. An electrical igniter mounted in a heat sink is provided for initiating combustion of the mixture in the region of the upper end of said elongated tubular member. Heater means is then provided to maintain the temperature of said heat sink above the dew point temperature of air or the mixture to maintain said igniter free from moisture in the wake of detonation waves produced in the region of said outlet port.

For a more complete understanding of the present invention and for further objects and advantages thereof, reference may now be had to the following description taken in conjunction with the accompanying drawings in which:

The single FIGURE illustrates partially in section and in schematic form a system embodying the present invention.

Referring to the figure, there is illustrated a detonation tube 10 having the lower or outlet end thereof 11 immersed beneath the surface 12 of a body of water. The detonation tube 10 is shown highly enlarged and is to be taken as representative of the tube 10′ carried by a boat 13. In the form shown, the detonation tube 10 is characterized by a lower portion of substantial diameter and upper portions 14a and 14b of substantially reduced diameter.

A gas or fluid flow system is connected to the upper portion of section 14b and is so constructed as to insure proper mixing of component fluids. A combustible mixture is fed to the detonation tube member 14b by way of a mixing chamber 15. The combustible mixture is composed of air from source 16, oxygen from source 17 and a combustible fluid from source 18, each in suitable proportions. Propane gas has been found to be suitable as a combustible fluid. Gas components are fed by way of mixers 19 and 20 and channel 20b to the mixing chamber 15. The mixture flows from chamber 15 into section 14b, to the lower enlarged section of the detonation tube 10 and thence out of the tube through the outlet end 11.

The fluid components may flow continuously from sources 16, 17 and 18 to form a combustible mixture. Air is introduced into mixer unit 19 by way of input channel 19a whereas oxygen is introduced through conduit 19b. A housing encompassing a section of the flow channel forms a chamber into which oxygen is introduced. A Venturi nozzle is provided between the input section 19a and the output channel 19c. Oxygen in the chamber outside the flow channel 19a, 19c is drawn into the stream of air from source 16. The oxygen-air stream is then fed by conduit 19c to a similar mixer unit 20 wherein combustible fluid is introduced by way of conduit 20a.

The output channel 20b is connected to the upper end of the baffled mixing chamber 15. Chamber 15 is formed of a relatively large tube in which a series of baffle plates such as the plate 15a is provided. The plate 15a is D-shaped, having a radius equal the inside radius of tube 15. The circular portions thereof are then welded to the inner surface of the tube 15. The dimension of the plate 15a in direction perpendicular to the free edge, i.e., perpendicular to a line passing through the axis of tube 15, is preferably greater than the radius of the tube 15. A second baffle 15b, and the additional baffles illustrated in the figure, are welded alternately to opposite sides of the tube 15 so that the fluid mixture must follow a tortuous path before entry into the detonation tube member 14b. Turbulence thus produced in the fluid stream at each of several points along the flow path tends to thoroughly mix the components so that a uniform combustible gas mixture appears at the output of the chamber 15.

In accordance with the present invention, repeated detonation of the mixture is accomplished by use of an igniter unit 30. The igniter 30, which conveniently may be a spark plug, is mounted in a heat sink 31. The heat sink 31, in the form illustrated, comprises a hollow metallic cylinder of substantial diameter having an inner bore which corresponds with the inner bore of the small diameter portion 14a of tube 10. The upper portion 14b of tube 10 has the same internal diameter and is connected to the lower end of the mixing chamber 15. Heat sink 31 is provided with a port in which the igniter 30 is fitted with the spark gap within the central channel. Provision is made for electrically heating the heat sink 31. In the form illustrated a source 31a of electrical energy is connected to a heating coil 31b which encircles the cylinder 31. Preferably the source 31a is controlled to maintain the temperature of heat sink 31 such that evaporation of any moisture is accelerated. Preferably this temperature would be of the order of the boiling point of water but would be advantageous at such lower temperatures as are substantially above the dew point of the air. The temperature should be below the ignition temperature of the gas mixture. By this means moisture in and around the spark gap in igniter 30 will be evaporated to maintain a high impedance across the spark gap and thereby permit repetitive firing.

Igniter 30 is connected electrically to a pulser 33 by way of channel 32. Pulser 33 actuated by control element 34 periodically excites the igniter 30 to initiate combustion of the mixture. Following ignition of the mixture, the flame front travels in both directions. In the downward direction the velocity of the flame front increases until a detonation wave is produced, the velocity of the flame front reaching a velocity substantially in excess of the velocity of sound, ultimately attaining a substantially constant velocity. The detonation wave and the accompanying combustion products strike the surface of the water at the muzzle of tube 10 to generate seismic waves.

In the upward direction, as the flame front proceeds through the baffle unit 15, it becomes extinguished by reason of the variation in mixture or the nature of the path or a combination of both. In any event, burning ceases immediately following detonation of one charge of combustible mixture in the detonation tube. Tube 10 is then recharged with a combustible mixture by the flow of fluid components from source 16, 17 and 18.

As each detonation wave strikes the surface of the water in which tube 10 is immersed, gases are forced out of the tube and return to the surface outside the tube. Thereafter, low pressures are developed in the tube, tending to draw in water as a spray or mist. In some cases it has been suspected that the tube 10 is substantially filled with water in response to the low pressures involved. Continued flow of gas, including air from source 16, forces water out of the tube. The tube 10 is thus promptly reloaded with a combustible gas. However, fouling of the spark plug by moisture in the system has been found to prevent reliable repetitive operation. By providing a heat sink to maintain the spark gap structure at a relatively high temperature such that moisture cannot remain thereon and yet at a temperature sufficiently below the level necessary to ignite the gases, reliable operation may be achieved.

By means of the system thus described, the igniter 30 may be excited at intervals as short as from 1 to 3 seconds, reliably to produce repeated seismic impulses of uniform character and repetition rate.

With the system thus far described, the boat 13 may proceed along a charted course towing behind it a spread of seismic detectors connected to a cable 45. Cable 45 is maintained at a substantially uniform depth by a float 46 and a depth vane 46' suitably coupled together and to the boat 13. Signals from the cable 45 are applied by way of the reel 47 and amplifier 48 and thence preferably to a system 49 which is adapted to combine signals from cable 45 from prior seismic events. The combined signals are applied to a recorder 51 by way of channel 50. Preferably, a precision power supply 52 is provided to drive motor 53 for the compositor 49 and motor 54 for the recorder 51 in a predetermined relationship. Shaft 55 leading from motor 54 supports a plurality of switch actuating cams. A first cam 56 serves to actuate the control element 34 so that detonation waves are initiated by pulser 33 and igniter 30 repetitively and in synchronism with the chart recorder 51 and the compositor 49. Cam 57 actuates control element 58 which is connected to unit 59 which may serve to control the flow of combustible fluid from source 18 into the channel 20 by regulating valve 60. Combustible fluid injection may be limited to only about one-half of the time in those operations where pulse rates are on the order of one pulse every three seconds. Similarly, cam 61 actuates control element 62 which is connected to unit 63 which in turn may control valve 64 to limit the time during which oxygen may flow from source 17. By this means, continuous air flow sweeps the tube free from combustion products following each detonation cycle. Flow of combustible fluid and oxygen is then re-established to supply a desired mixture in the tube 10 prior to succeeding excitation of igniter 30. Conservation of both oxygen and combustible fluid is effected, though repetitive pulse generation is maintained. It has been found that reliable operation may be produced using only air and combustible fluid and that the addition of oxygen serves to increase the magnitude of the energy in the detonation wave as it strikes the water at the outlet port of the detonation tube. However, with or without the addition of oxygen, repetitive operation may be carried out with small variations in the time between ignition at spark plug 30 and the impact of the resultant detonation wave. Tolerable variations may be of the order of one millisecond. It will be appreciated that variations in detonation time will cause data on chart recorder 51 to become generally smeared and less distinct whereas uniform detonation intervals will permit the recording of sharp and distinct lines each indicative of the presence of a subsurface reflecting horizon. While the permissible variation will depend somewhat on the resolution desired, it has been found preferable to limit it to less than one millisecond.

The lower portion of the detonation tube 10 may be formed of a length of pipe of the order of 22'–25' long and 6" in diameter. The combined length of section 14a, heat sink 31 and section 14b may be of the order of 2' long and 2" in diameter.

The mixing chamber 15, 21" long and 4" in diameter, has been found to be satisfactory. Six baffles therein, spaced about 3" apart and each extending from the wall to chamber 15 to a point about ¼" beyond the axis thereof so that the edges of the baffles overlapped each other by about ½", serve to assure complete mixture of the gas components.

Flow rates of the following order may be found suitable: Liquid propane from source 18 at about 12½ gallons per hour; and gaseous oxygen at 750 cubic feet per hour. With the above flow rates preset, the flow of compressed air may be gradually increased until repetitive firing takes place. Air flow generally should be maintained at about the order of 145 cubic feet per minute at 100 p.s.i.

In the ignition system a voltage should be of the order of 5,000 volts for application to a spark gap of about ⅛". Power capacity of the source should be of the order of 1.5 watt seconds.

The waves produced by the present system are suitable for conducting seismic exploration to depths of several thousand feet. Chart recorder 51 may provide a graphic portrayal of variations of subsurface reflectors. The sound source is particularly suitable in that the predominant frequency of the resultant waves is substantially the same in repeated events and lies within the frequency band ordinarily employed in seismic exploration. The predominant frequency is of the order of from 30 to 100 cycles per second.

Having described the invention in connection with certain embodiments thereof, it will now be understood that further modifications will suggest themselves to those skilled in the art and it is intended to cover such modifications as fall within the scope of the appended claims.

What is claimed is:

1. In a system for generating seismic waves the combination of flow means for entraining in an air stream at least one combustible fluid component to form a combustible mixture, structure coupled to said flow means and forming a flow channel into which said mixture flows and characterized by an inlet passage and a smooth-walled tubular member extending therefrom and having an outlet port, means mounted on said structure for heating a portion of said structure in the region of a juncture between said inlet passage and said tubular member to a temperature above the dew point and below the ignition temperature of said mixture, and electrical means mounted in said portion of said structure for initiating combustion of said mixture.

2. In a system for generating seismic waves wherein a combustible gas mixture is repeatedly ignited in an elongated tube having a lower end thereof immersed in a water body, the combination which comprises structure forming a portion of said tube adjacent an end opposite said lower end and providing a heat sink, an electrical igniter mounted in said heat sink and including electrodes providing a spark source in said tube for repetitively igniting said mixture, and means coupled to said heat sink for maintaining the temperature of said heat sink in the range between the dew point and ignition temperature of said mixture.

3. In a seismic wave source where an elongated tube is positioned vertically with the lower end thereof immersed in a water body and in which a combustible gas mixture is repeatedly ignited by an electrical spark-producing means at the upper end thereof, the combination which comprises structure forming a portion of said tube in the region of said upper end and adapted to receive and support said spark-producing means to generate a detonation wave traveling downwardly through said tube, and means coupled to said structure for maintaining said structure at a temperature in the range between the dew point and the ignition temperature of said mixture for preventing fouling of said spark-producing means by moisture drawn into said tube in the wake of each said detonation wave.

4. In a seismic wave source where an elongated tube is positioned vertically with the lower end thereof immersed in a water body and in which a combustible gas mixture is repeatedly ignited by an electrical spark-producing means in the upper end thereof, the combination which comprises structure forming a portion of said tube in the region of said upper end and adapted to receive and support said spark-producing means to generate a detonation wave traveling downwardly through said tube, and an electrical heater mounted on said structure and adapted to maintain said structure at a temperature in the range between the dew point and the ignition temperature of said mixture for preventing fouling of said spark-producing means by moisture drawn into said tube in the wake of each said detonation wave.

5. In a system for generating seismic waves initially within a body of liquid the combination of flow means for entraining in an air stream at least one combustible fluid component to form a combustible mixture, structure coupled to said flow means and forming a flow channel into which said mixture flows and characterized by an inlet passage and a smooth-walled tubular member extending therefrom and having an outlet port for immersion in the body of liquid, means comprising a heat sink coupling said inlet passage and said tubular member, means mounted on said heat sink for applying heat to said sink to maintain the area within said structure and adjacent said sink above the dew point and below the ignition point of said mixture, and an electrical means mounted in said heat sink for initiating combustion of said mixture.

References Cited in the file of this patent

UNITED STATES PATENTS

| | | |
|---|---|---|
| 1,465,935 | Eastman | Aug. 28, 1923 |
| 1,500,243 | Hammond | July 8, 1924 |
| 2,353,484 | Marten et al. | July 11, 1944 |
| 2,679,205 | Piety | May 25, 1954 |
| 2,766,837 | McCollum | Oct. 16, 1956 |
| 2,772,746 | Merten | Dec. 4, 1956 |
| 2,793,308 | Harper | May 21, 1957 |